США011338461B2

(12) United States Patent
Hernandez et al.

(10) Patent No.: US 11,338,461 B2
(45) Date of Patent: May 24, 2022

(54) SYSTEM FOR MACHINING THE ABRADABLE MATERIAL OF A TURBOFAN ENGINE

(71) Applicant: General Electric Company, Schenectady, NY (US)

(72) Inventors: Benjamin Tonatiuh Hernandez, Queretaro (MX); German Pulido, Queretaro (MX); Enrique Martinez, Queretaro (MX); Marc Edward Christopfel, Cincinnati, OH (US); Cristobal Reyes, Queretaro (MX)

(73) Assignee: General Electric Company, Schenectady, NY (US)

( * ) Notice: Subject to any disclaimer, the term of this patent is extended or adjusted under 35 U.S.C. 154(b) by 79 days.

(21) Appl. No.: 16/395,914

(22) Filed: Apr. 26, 2019

(65) Prior Publication Data
US 2020/0338772 A1    Oct. 29, 2020

(51) Int. Cl.
*B23C 3/00*    (2006.01)
*B26D 1/16*    (2006.01)
(Continued)

(52) U.S. Cl.
CPC ............... *B26D 1/16* (2013.01); *B23C 3/02* (2013.01); *B23C 5/04* (2013.01); *B23Q 9/02* (2013.01);
(Continued)

(58) Field of Classification Search
CPC .... B23C 3/00; B23C 3/02; B23C 3/34; B23C 3/18; B23C 3/16; B23C 3/161;
(Continued)

(56) References Cited

U.S. PATENT DOCUMENTS 1,432,580 A * 10/1922 Vauclain ................ B23C 5/006
407/31
2,238,785 A    4/1941 Walton
(Continued)

FOREIGN PATENT DOCUMENTS

DE          877091 C      5/1953
EP          1918524 A2    5/2008
(Continued)

OTHER PUBLICATIONS

Drozda et al.,Tool and Manufacturing Engineers Handbook; 1983, McGraw-Hill Book Co., vol. 1, chapter 10, pp. 10-11 to 10-3 (Year: 1983).*
(Continued)

*Primary Examiner* — Nicole N Ramos
(74) *Attorney, Agent, or Firm* — Fitch, Even, Tabin & Flannery LLP (57) ABSTRACT

A system for machining an abradable material of a gas turbine engine and associated methods. The system includes a frame including a first arm extending from a central location. The system further includes an attachment structure coupled to the frame at the central location. Moreover, the attachment structure is configured to couple to at least a fan rotor of the gas turbine engine. Additionally, the system includes a cutting apparatus coupled to a first distal end of the first arm opposite the central location. The cutting apparatus includes a rotating shaft and plurality of cutting disks coupled to the rotating shaft. Further, the plurality of cutting disks define a helical cutting profile configured to machine a contour within the abradable material complementary to at least one fan blade of the gas turbine engine.

19 Claims, 7 Drawing Sheets

(51) Int. Cl.
   *B23C 3/02*  (2006.01)
   *B23C 5/04*  (2006.01)
   *B23Q 9/02*  (2006.01)
(52) U.S. Cl.
   CPC .... *B23C 2210/244* (2013.01); *B23C 2215/04* (2013.01); *B23C 2270/18* (2013.01); *F05D 2230/10* (2013.01)
(58) Field of Classification Search
   CPC ..... B23C 3/162; B23C 5/12; B23C 2210/244; B23C 2210/242; B23C 2210/325; B23C 2210/323; B23C 2215/242; B23C 2215/245; B23C 2215/04; B23C 2215/24; B23C 2200/206; B23C 2200/205; B23C 2250/08; B23C 2250/04; B23C 2220/56; B23C 2220/68; Y10T 409/306384; Y10T 409/30644; Y10T 409/300392; Y10T 409/300504; Y10T 409/30056; Y10T 409/300616; Y10T 409/300784; Y10T 409/307616; Y10T 409/30756; Y10T 409/303752; Y10T 409/303808; Y10T 409/304424
   See application file for complete search history.

(56) References Cited

U.S. PATENT DOCUMENTS

| | | | |
|---|---|---|---|
| 3,577,809 A * | 5/1971 | Brandl | B23B 29/03421 408/186 |
| 4,219,291 A | 8/1980 | Hoeh | |
| 4,455,787 A | 6/1984 | Sharon | |
| 5,201,353 A * | 4/1993 | Weill | B23C 5/00 144/208.4 |
| 5,281,062 A * | 1/1994 | Dunkman | B23P 6/002 409/179 |
| 5,293,717 A | 3/1994 | Snyder et al. | |
| 6,146,089 A | 11/2000 | Allen et al. | |
| 7,278,208 B2 | 10/2007 | Le Saint et al. | |
| 7,836,594 B2 | 11/2010 | Rose | |
| 8,276,488 B2 | 10/2012 | Backhouse | |
| 8,474,140 B2 | 7/2013 | Erbes et al. | |
| 8,974,357 B2 | 3/2015 | Kitayama et al. | |
| 2008/0095590 A1 * | 4/2008 | Costa | F04D 29/545 409/132 |
| 2015/0031272 A1 | 1/2015 | Fulton et al. | |
| 2016/0121409 A1 | 5/2016 | Withey | |
| 2018/0229314 A1 | 8/2018 | Lifka | |
| 2019/0210119 A1 * | 7/2019 | Teusch | B23C 5/04 |

FOREIGN PATENT DOCUMENTS

| | | | |
|---|---|---|---|
| EP | 3017898 A1 | 5/2016 | |
| GB | 2240735 A | 8/1991 | |
| WO | WO-2018041290 A1 * | 3/2018 | ............... C23C 4/02 |

OTHER PUBLICATIONS

European Search Report Corresponding to Application No. 20168262 dated Sep. 10, 2020.

* cited by examiner

202 SECURE THE FRAME OF THE SYSTEM TO AT LEAST A FAN ROTOR OF THE GAS TURBINE ENGINE UTILIZING AN ATTACHMENT STRUCTURE OF THE SYSTEM, THE ATTACHMENT STRUCTURE COUPLED TO THE FRAME AT THE CENTRAL LOCATION

↓

204 ADJUST THE CUTTING APPARATUS IN AN AXIAL DIRECTION OF THE GAS TURBINE ENGINE UTILIZING AN AXIAL ADJUSTER COUPLED BETWEEN THE FIRST DISTAL END OF THE FIRST ARM AND THE CUTTING APPARATUS SUCH THAT THE CUTTING APPARATUS IS AXIALLY ALIGNED WITH THE ABRADABLE MATERIAL

↓

206 DRIVE THE ROTATING SHAFT OF THE CUTTING APPARATUS SUCH THAT THE PLURALITY OF CUTTING DISKS ROTATES ABOUT THE AXIAL DIRECTION

↓

208 ADJUST THE CUTTING APPARATUS IN AN RADIAL DIRECTION OF THE GAS TURBINE ENGINE UTILIZING AN RADIAL ADJUSTER COUPLED BETWEEN THE FIRST DISTAL END OF THE FIRST ARM AND THE CUTTING APPARATUS SUCH THAT AT LEAST ONE OF THE CUTTING DISKS CONTACTS THE ABRADABLE MATERIAL IN ORDER TO MACHINE THE ABRADABLE MATERIAL.

FIG. 7

SYSTEM FOR MACHINING THE ABRADABLE MATERIAL OF A TURBOFAN ENGINE

FIELD

The present subject matter relates generally to the abradable material of a turbofan engine, more particularly, to systems and associated methods for machining a contour of the abradable material of a turbofan engine.

BACKGROUND

A turbofan engine generally includes a fan and a core arranged in flow communication with one another. Additionally, the core of the turbofan engine generally includes, in serial flow order, a compressor section, a combustion section, a turbine section, and an exhaust section. In operation, air is provided from the fan to an inlet of the compressor section where one or more axial compressors progressively compress the air until it reaches the combustion section. Fuel is mixed with the compressed air and burned within the combustion section to provide combustion gases. The combustion gases are routed from the combustion section to the turbine section. The flow of combustion gases through the turbine section drives the turbine section and is then routed through the exhaust section, e.g., to atmosphere. Turbofan gas turbine engines typically include a fan assembly that channels air to a core assembly, such as an inlet to the compressor section, and to a bypass duct. Turbofan engines generally include fan cases surrounding a fan assembly including the fan blades.

In most turbofan engines, the fan is contained by a fan case that includes a shroud. The shroud circumscribes the fan and is adjacent to the tips of the fan blades. The shroud serves to channel incoming air through the fan so as to ensure that most of the air entering the engine will be compressed by the fan. A small portion of the air is able to bypass the fan blades through a radial gap present between the tips of the fan blades and the shroud. The radial gap is very narrow such that the amount of air that is able to bypass the fan through the gap is limited. The efficiency of the engine can be significantly improved in this way.

Because the gap is narrow, the fan blades may rub the shroud during the normal operation of an aircraft turbofan engine. An abradable material is configured into the shroud for this purpose. Accordingly, the fan and shroud are manufactured to assure close tolerances in order to minimize this gap. Typically during manufacture the surface of the abradable material is ground or machined to the same contour as the fan blade. Generally, the abradable material is ground using a cutter, such as a router bit, which machines a small portion that must be adjusted axially, radially, and circumferentially by hand. However, such a machining process may be time consuming, labor intensive, and subject to discrepancies between operators of the machine.

As such, a need exists for an improved system and associated methods for machining a contour of the abradable material of turbofan engines that reduces the machining time as well as increases consistency between machining operations.

BRIEF DESCRIPTION

Aspects and advantages will be set forth in part in the following description, or may be obvious from the description, or may be learned through practice of the invention.

In one aspect, the present subject matter is directed to a method of machining an abradable material of a gas turbine engine utilizing a system including a frame, a first arm extending from a central location of the frame, and a cutting apparatus. The cutting apparatus is coupled to a first distal end of the first arm and includes a rotating shaft and a plurality of cutting disks coupled to the rotating shaft such that the cutting disks define a helical cutting profile. As such, the method includes securing the frame of the system to at least a fan rotor of the gas turbine engine utilizing an attachment structure of the system coupled to the frame at the central location. The method further includes adjusting the cutting apparatus in an axial direction of the gas turbine engine utilizing an axial adjuster coupled between the first distal end of the first arm and the cutting apparatus such that the cutting apparatus is axially aligned with the abradable material. The method also includes driving the rotating shaft of the cutting apparatus such that the plurality of cutting disks rotates about the axial direction. Additionally, the method includes adjusting the cutting apparatus in a radial direction of the gas turbine engine utilizing a radial adjuster coupled between the first distal end of the first arm and the cutting apparatus such that at least one of the cutting disks contacts the abradable material in order to machine the abradable material.

In one embodiment, the abradable material may include a repaired portion. In an additional embodiment, the method may further include rotating the system around a circumferential direction of the gas turbine engine such that the cutting apparatus machines at least a portion of the abradable material along the circumferential direction. In another embodiment, the system may further include a second arm extending from the central location of the frame and an axially aligned measurement assembly including a measurement probe coupled to a second distal end of the second arm. In such an embodiment, the method may include inspecting a contour of the abradable material by adjusting a position of the measurement probe along the axial direction. In a further embodiment, adjusting the position of the measurement probe may include rotating an adjustment wheel coupled to a threaded rod operable with the measurement probe in order to adjust the measurement probe axially forward or aft.

In another embodiment, adjusting the cutting apparatus in the axial direction may include rotating an axial adjustment wheel drivingly coupled to a threaded rod of the axial adjuster extending at least partially along the axial direction. Moreover, the threaded rod may be operable with the cutting apparatus such that the cutting apparatus is adjusted at least partially in the axial direction. In a further embodiment, adjusting the cutting apparatus in the radial direction may include rotating a radial adjustment wheel operable with one or more jacks of the radial adjuster. As such, the jack(s) may be configured to extend and retract the cutting apparatus at least partially in the radial direction of the gas turbine engine.

In another aspect, the present subject matter is directed to a system for machining an abradable material of a gas turbine engine. The system includes a frame including a first arm extending from a central location. The system further includes an attachment structure coupled to the frame at the central location. Moreover, the attachment structure is configured to couple to at least a fan rotor of the gas turbine engine. Additionally, the system includes a cutting apparatus coupled to a first distal end of the first arm opposite the central location. The cutting apparatus includes a rotating shaft and plurality of cutting disks coupled to the rotating shaft. Further, the plurality of cutting disks define a helical cutting profile configured to machine a contour within the abradable material complementary to at least one fan blade of the gas turbine engine.

In one embodiment, the plurality of cutting disks may be configured to extend along a total length of the abradable material in an axial direction of the gas turbine engine. In a further embodiment, the attachment structure may include a support ring configured to be coupled to at least the fan rotor of the gas turbine engine. In additional embodiments, the system may include an air motor drivingly coupled to the rotating shaft of the cutting apparatus and configured to rotate the plurality of cutting disks.

In another embodiment, the frame may further include a second arm extending from the central location. In such an embodiment, a measurement assembly may be coupled to a second distal end of the second arm opposite the central location. Moreover, the measurement assembly may be configured to inspect the contour of the abradable material. Additionally, the measurement assembly may include a threaded rod configured to extend at least partially along an axial direction of the gas turbine engine, a measurement probe extending from and operable with the threaded rod, and an adjustment wheel configured to rotate the threaded rod such that the measurement probe is adjusted at least partially in the axial direction of the gas turbine engine.

In another embodiment, the system may further include an adjustment mechanism coupled between the first distal end of the first arm and the cutting apparatus. The adjustment mechanism may be configured to adjust a position of the cutting apparatus along an axial direction and a radial direction of the gas turbine engine. In one such embodiment, the adjustment mechanism may include an axial adjuster including a threaded rod operable with the cutting apparatus and configured to extend at least partially along an axial direction of the gas turbine engine. The adjustment mechanism may further include an axial adjustment wheel configured to rotate the threaded rod such that the cutting apparatus is adjusted at least partially in the axial direction. In a further embodiment, the adjustment mechanism may include a radial adjuster including at least one jack operable with the cutting apparatus and a radial adjustment wheel configured to extend and retract the cutting apparatus at least partially in the radial direction of the gas turbine engine.

In an additional embodiment, the rotating shaft may include a key extending along a length of the rotating shaft. Additionally, each cutting disk of the plurality of cutting disks may include a notch operable with the key such that the plurality of cutting disks defines the helical cutting profile. In a further embodiment, the plurality of cutting disks may include two or more cutting disks defining different diameters. In another embodiment, the plurality of cutting disks may include between 18 and 46 cutting disks. In an additional embodiment, the plurality of cutting disks of the cutting apparatus may be configured to rotate about an axial direction of the gas turbine engine. It should be further understood that the system may further include any of the additional features as described herein.

These and other features, aspects and advantages will become better understood with reference to the following description and appended claims. The accompanying drawings, which are incorporated in and constitute a part of this specification, illustrate embodiments of the invention and, together with the description, serve to explain certain principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended FIGS., in which.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

The terms "communicate," "communicating," "communicative," and the like refer to both direct communication as well as indirect communication such as through a memory system or another intermediary system.

A system for machining an abradable material of a turbofan engine is generally provided. For instance, the system may be utilized to machine an abradable coating surrounding fan blades in a fan section of a turbofan engine. The system may include a frame including a first arm extending from a central location. Further, the frame may be attached to a fan rotor of the turbofan engine at the central location utilizing an attachment structure. The system may further include a cutting apparatus coupled to a first distal end of the first arm opposite the central location. Additionally, the cutting apparatus may include a rotating shaft and a plurality of cutting disks coupled to the rotating shaft. Moreover, the cutting disks may define a helical cutting profile configured to machine a contour within the abradable coating complementary to one or more of the fan blades of the turbofan engine. In certain embodiments, the cutting disks may extend the full length of the abradable material and the system may be rotated around a circumferential direction of the turbofan engine in order to machine the entire abradable coating without the need to axially adjust the system and/or the cutting apparatus. Further, the helical cutting profile of the cutting disks may reduce the number of teeth of the cutting disks machining the abradable material at any one instant. As such, the torque required to operate the cutting apparatus may be reduced.

Figure 1:
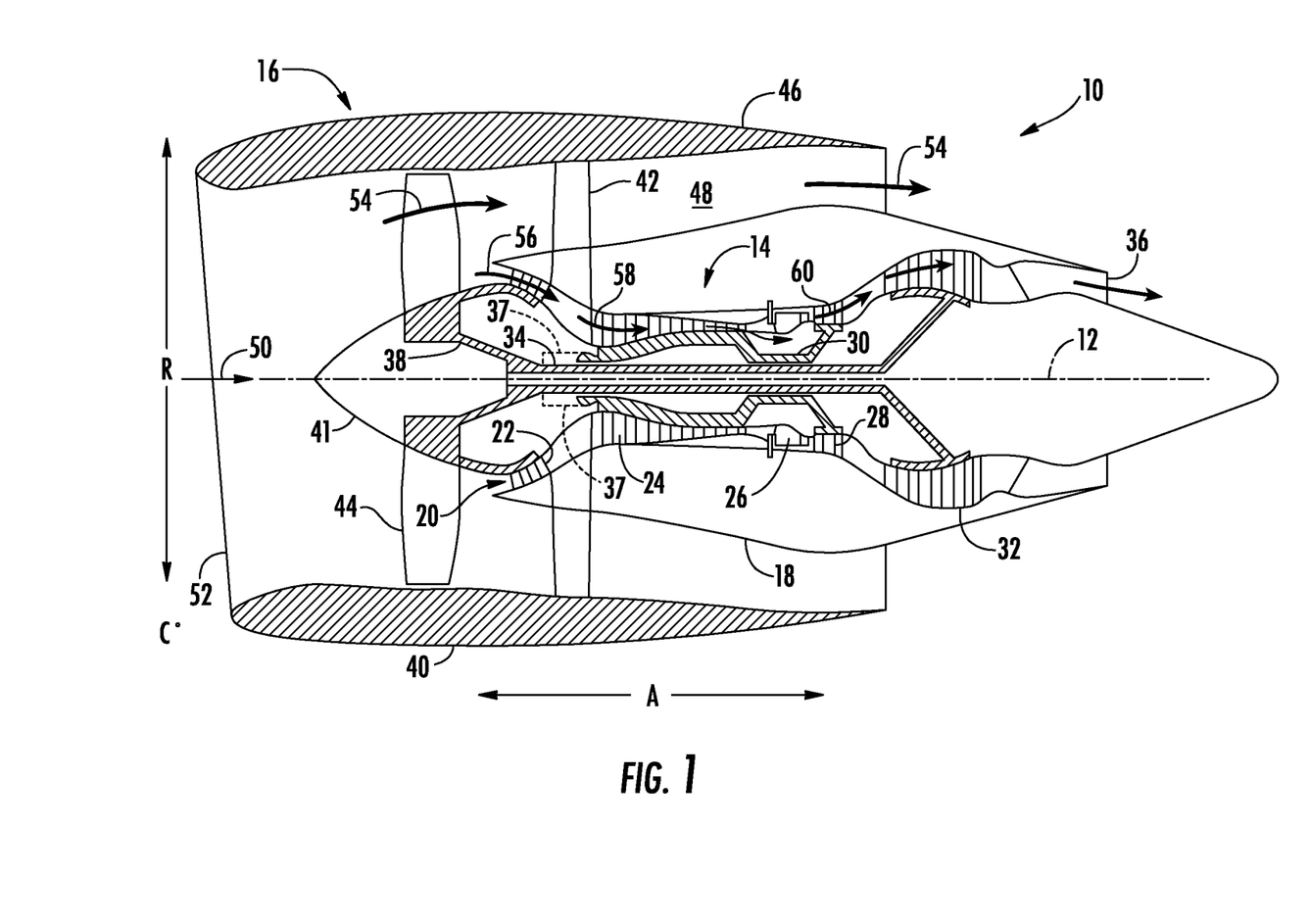
FIG. 1 illustrates a cross-sectional view of one embodiment of a gas turbine engine that may be utilized within an aircraft in accordance with aspects of the present subject matter, particularly illustrating the gas turbine engine configured as a high-bypass turbofan jet engine.

Referring now to the drawings, FIG. 1 illustrates a cross-sectional view of one embodiment of a gas turbine engine that may be utilized within an aircraft in accordance with aspects of the present subject matter. More particularly, for the embodiment of FIG. 1, the gas turbine engine is a high-bypass turbofan jet engine (turbofan engine 10), with the turbofan engine 10 being shown having a longitudinal or axial centerline axis 12 extending therethrough along an axial direction A for reference purposes. The turbofan engine 10 further defines a radial direction R extending perpendicular from the centerline 12. Further, a circumferential direction C (shown in/out of the page in FIG. 1) extends perpendicular to both the centerline 12 and the radial direction R. Although an exemplary turbofan embodiment is shown, it is anticipated that the present disclosure can be equally applicable to turbomachinery in general, such as an open rotor, a turboshaft, turbojet, or a turboprop configuration, including marine and industrial turbine engines and auxiliary power units.

In general, the turbofan engine 10 includes a core assembly (indicated generally by reference character 14) and a fan section 16 positioned upstream thereof. The core assembly 14 generally includes a substantially tubular outer casing 18 that defines an annular inlet 20. In addition, the outer casing 18 may further enclose and support a low pressure (LP) compressor 22 for increasing the pressure of the air that enters the core assembly 14 to a first pressure level. A multi-stage, axial-flow high pressure (HP) compressor 24 may then receive the pressurized air from the LP compressor 22 and further increase the pressure of such air. The pressurized air exiting the HP compressor 24 may then flow to a combustor 26 within which fuel is injected into the flow of pressurized air, with the resulting mixture being combusted within the combustor 26. The high energy combustion products 60 are directed from the combustor 26 along the hot gas path of the turbofan engine 10 to a high pressure (HP) turbine 28 for driving the HP compressor 24 via a high pressure (HP) shaft or spool 30, and then to a low pressure (LP) turbine 32 for driving the LP compressor 22 and fan section 16 via a low pressure (LP) drive shaft or spool 34 that is generally coaxial with HP shaft 30. After driving each of turbines 28 and 32, the combustion products 60 may be expelled from the core assembly 14 via an exhaust nozzle 36 to provide propulsive jet thrust.

Figure 2:
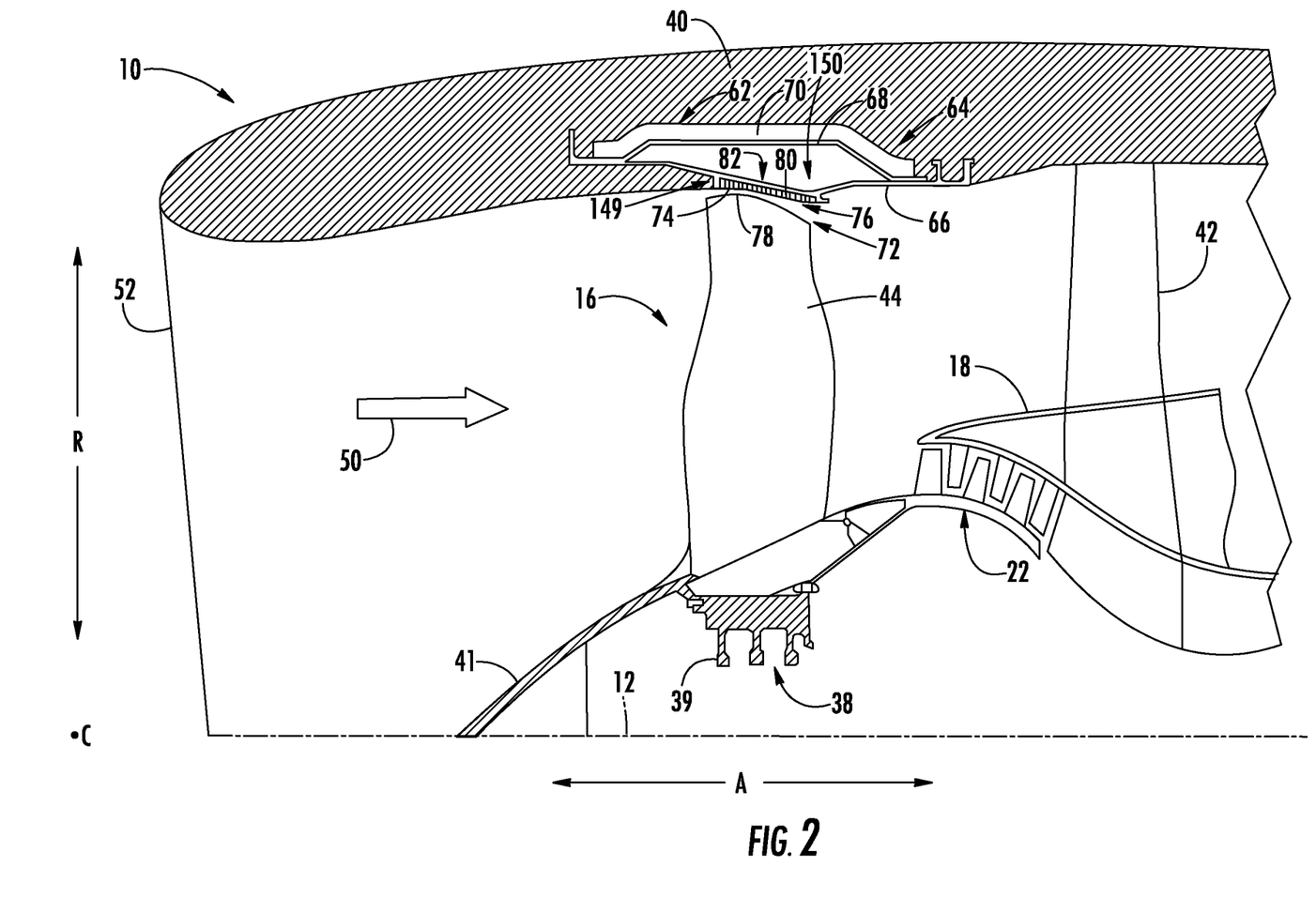
FIG. 2 illustrates a cross-sectional view of the fan section of FIG. 1 in accordance with aspects of the present subject matter, particularly illustrating an abradable material of a fan section of the turbofan engine.

Additionally, as shown in FIGS. 1 and 2, the fan section 16 of the turbofan engine 10 generally includes a rotatable, axial-flow fan rotor 38 configured to be surrounded by an annular fan casing 40. In particular embodiments, the LP shaft 34 may be connected directly to the fan rotor 38 or rotor disk 39, such as in a direct-drive configuration. In alternative configurations, the LP shaft 34 may be connected to the fan rotor 38 via a speed reduction device 37 such as a reduction gear gearbox in an indirect-drive or geared-drive configuration. Such speed reduction devices may be included between any suitable shafts/spools within the turbofan engine 10 as desired or required. Additionally, the fan rotor 38 and/or rotor disk 39 may be enclosed or formed as part of a fan hub 41.

It should be appreciated by those of ordinary skill in the art that the fan casing 40 may be configured to be supported relative to the core assembly 14 by a plurality of substantially radially-extending, circumferentially-spaced outlet guide vanes 42. As such, the fan casing 40 may enclose the fan rotor 38 and its corresponding fan rotor blades (fan blades 44). Moreover, a downstream section 46 of the fan casing 40 may extend over an outer portion of the core assembly 14 so as to define a secondary, or by-pass, airflow conduit 48 that provides additional propulsive jet thrust.

During operation of the turbofan engine 10, it should be appreciated that an initial airflow (indicated by arrow 50) may enter the turbofan engine 10 through an associated inlet 52 of the fan casing 40. The air flow 50 then passes through the fan blades 44 and splits into a first compressed air flow (indicated by arrow 54) that moves through the by-pass conduit 48 and a second compressed air flow (indicated by arrow 56) which enters the LP compressor 22. The pressure of the second compressed air flow 56 is then increased and enters the HP compressor 24 (as indicated by arrow 58). After mixing with fuel and being combusted within the combustor 26, the combustion products 60 exit the combustor 26 and flow through the HP turbine 28. Thereafter, the combustion products 60 flow through the LP turbine 32 and exit the exhaust nozzle 36 to provide thrust for the turbofan engine 10.

Referring now particularly to FIG. 2, the turbofan engine 10 may include an abradable containment structure 62 circumscribing the fan blades 44. Further, the exemplary containment structure 62 of FIG. 2 may include a forward fan case 64. The forward fan case 64 may have an inner fan casing 66 that is usually made of aluminum, surrounded by an aluminum honeycomb surrounded by a graphite epoxy outer fan casing 68 surrounded by a KEVLAR® cover 70. The inner fan casing 66 may include a fan shroud 72 that defines an inner annular surface 74. The inner annular surface 74 may have a generally circular cross-section and define an inner diameter of the inner fan casing 66. The fan shroud 72 may be configured to channel the initial airflow flow 50 through the fan section 16 so as to ensure that the fan blades 44 will compress the bulk of the air entering the turbofan engine 10. By way of example and not limitation, the forward fan case 64 and the inner fan casing 66 can be made of the following: a metal, aluminum, a composite material, and a combination thereof. Additionally, a small radial gap 76 may be present between tips 78 of the fan blades 44 and the inner annular surface 74. Generally, the radial gap 76 may be minimized in order to promote the efficiency of the turbofan engine 10.

As shown in FIG. 2, the fan shroud 72 may include one or more abradable structures defining the inner annular surface 74. For instance, in certain embodiments, the abradable structure may be an abradable material such as an abradable coating 80. The abradable material may be a region against which the fan blades 44 may occasionally rub throughout engine operation. A typical abradable material may include an epoxy with phenolic microballoons disposed in and supported by an annular plastic honeycomb structure, bonded by adhesive to an annular layer of fiberglass, bonded by adhesive to the an inner annular groove 82 on the inner fan casing 66. However, the abradable material may be any suitable light weight material of the type known and used in the prior art, including composite materials, or the like. The abradable material may be provided in the form of one or more solid panels or formed from a loose material. For instance, the abradable material may generally comprise any low-density, syntactic film epoxy suitable for use in a clearance control application that can be resistant to damage from ice impact and can be easily repaired/replaced throughout the service life time of the fan casing, as explained herein below. One example of a suitable material for use as an abradable layer is Hysol® EA 9890, though the embodiments herein should not be limited to such. In alternative or additional embodiments, the abradable material may include one or more of epoxy and phenolic microspheres, Nomex® core, silicone with hollow glass microspheres, silicone polymer, porous Teflon®-PTFE plastic, epoxy with thermoplastic microspheres and polyether ether ketone (PEEK) fiber, two-part flame retardant epoxy with glass microspheres, epoxy with thermoplastic microspheres and nylon/PEEK fiber, or any combination thereof.

In order to achieve desirable aerodynamic efficiencies associated with maintaining a small radial gap 76 between the inner annular surface 74 of the abradable material and the fan blades 44, the inner annular surface 74 may define a contour that matches a contour of the tips 78 of one or more of the fan blades 44, such as all of the fan blades 44. Typically, fan shrouds 72 may be manufactured to assure close tolerances in order to minimize this radial gap 76. For example, as shown in FIG. 2, the surface of the abradable coating 80 may be ground or machined to a complementary contour to the contour the tip(s) 78 of the fan blades 44. During operation, when the fan blade(s) 44 rub the abradable coating 80, the inner annular surface 74 of the abradable coating 80 may be worn and/or broken away from the remainder of the abradable material and/or the inner fan casing 66. As such, by removing material from the abradable coating 80, damage and wear may be reduced on the fan blades 44 themselves and/or the other components of the containment structure 62.

Figure 3:
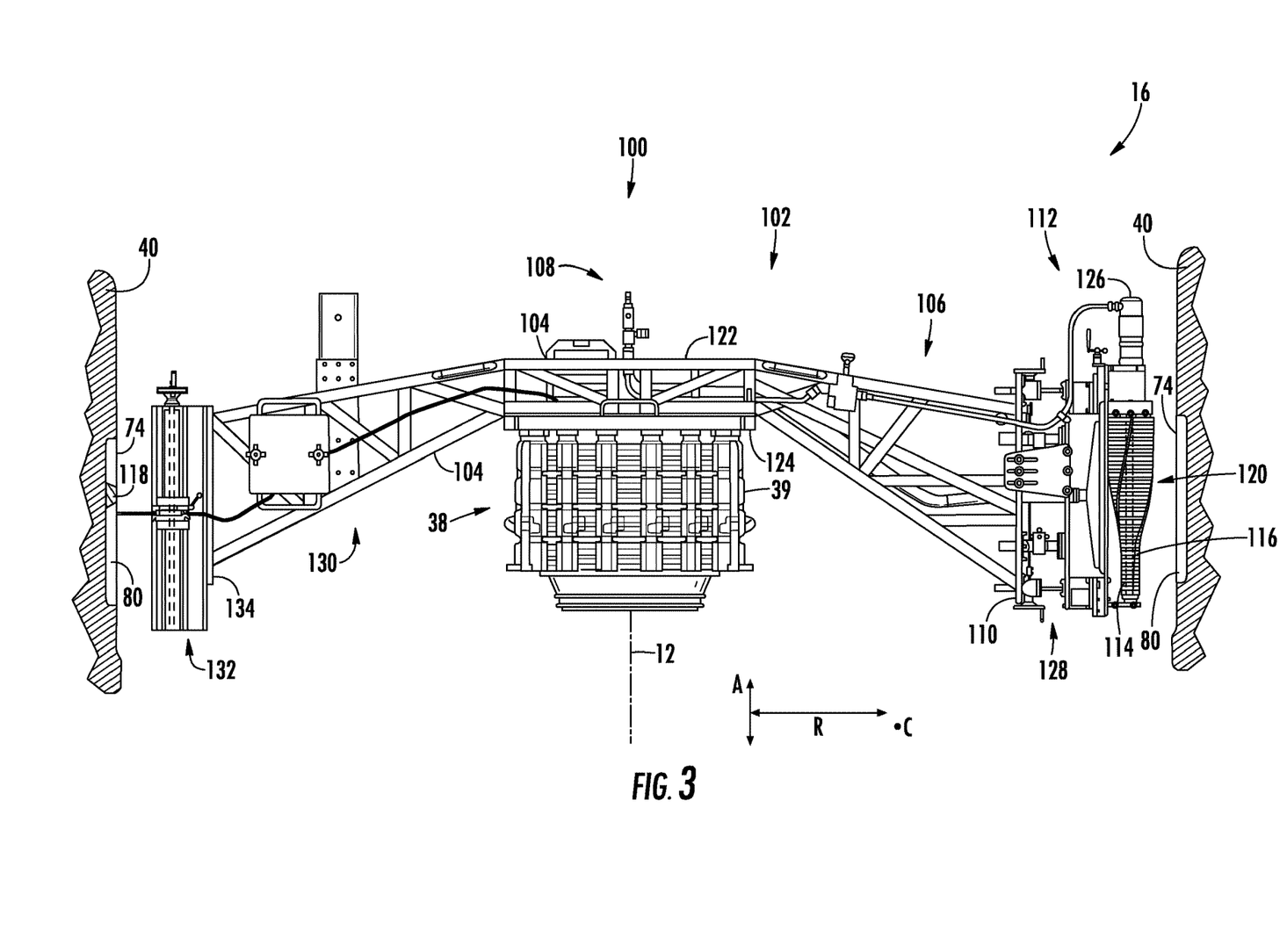
FIG. 3 illustrates one embodiment of a system for machining the abradable material of a turbofan engine in accordance with aspects of the present subject matter, particularly illustrating the system inserted within the fan section and coupled to a fan rotor.

Referring now to FIG. 3, one embodiment of a system 100 for machining an abradable material of a turbofan engine is illustrated according to aspects of the present disclosure. More particularly, FIG. 3 illustrates the system 100 inserted within a fan section 16 and coupled to the fan rotor 38. For instance, the system 100 may be utilized for machining the abradable coating 80 as described generally in regard to FIG. 2. However, it should be appreciated that the system 100 may be utilized to machine any suitable abradable material that may be utilized with a gas turbine engine, such as the turbofan engine 10 described generally in regard to FIGS. 1-2 or further suitable configurations of a gas turbine engine.

As shown in FIG. 3, the system 100 may be inserted into the fan section 16 of the turbofan engine 10 and attached to the fan rotor 38, such as the rotor disk 39. However, in other embodiments, the system 100 may be coupled to the fan rotor 38 through the fan hub 41 and/or over the fan hub 41. Alternatively, the fan hub 41 may be removed in order to attach the system 100 to the fan rotor 38. The system 100 may include a frame 102 including a number of frame members 104. Additionally, the system 100 includes a first arm 106 extending from a central location 108 of the frame 102. For instance, the central location 108 may be configured to align with the centerline 12 of the turbofan engine 10. The first arm 106 may generally be formed from one or more of the frame members 104 extending from the central location 108 to a first distal end 110. Further, the system 100 may include a cutting apparatus 112 coupled to the first distal end 110 of the first arm 106. The cutting apparatus 112 may include a rotating shaft 114 and two or more cutting disks 116 coupled to the rotating shaft 114 such that the cutting disks 116 define a helical cutting profile 120. Further, the helical cutting profile 120 may be configured to machine a contour within the abradable coating 80 complementary to one or more of the fan blades 44 of the turbofan engine 10, such as complementary to one or more of the tips 78 of the fan blades 44 (FIG. 2).

Generally, as shown in FIG. 3, the system 100 may be rotated in the circumferential direction C of the turbofan engine 10 such that the cutting apparatus 112 machines at least a portion of the abradable coating 80 along the circumferential direction C. For instance, the system 100 may machine the portion of the abradable coating 80 located radially outward from the cutting apparatus 112. In one embodiment, as illustrated, the fan rotor 38 may be rotated along the circumferential direction C such that the system 100 coupled to the fan rotor 38 is also rotating along the circumferential direction C. Further, the cutting disks 116 may be configured to extend along the full length of abradable coating 80 in the axial direction A. As such, rotating the system 100 360 degrees along the circumferential direction C may machine all of the inner annular surface 74. It should be recognized that the abradable coating 80 may be a new abradable coating 80 that requires machining in order to match and/or complement the contour of the tip(s) 78 of the fan blade(s) 44. In another situation, the abradable coating 80 may include a repaired portion 118 that requires machining in order to match and/or complement the contour of the tip(s) 78 of the fan blade(s) 44. In still another situation, the system 100 may be utilized to remove the innermost layer of the inner annular surface 74 of the abradable coating 80 so that a repair procedure may subsequently be performed on a newly machined inner annular surface 74.

As shown in FIG. 3, the system 100 may be attached to the fan rotor 38 or the rotor disk 39 (see FIGS. 1 and 2) via an attachment structure 122. The attachment structure 122 may generally be located at the central location 108 such that the system 100 may be rotated along the circumferential direction C about the centerline 12 of the turbofan engine 10. For instance, the attachment structure 122 may be coupled to the frame 102 at the central location 108. In another arrangement, the attachment structure 122 may include one or more of the frame members 104 also forming the frame 102. As illustrated in FIG. 3, the attachment structure 122 may include a support ring 124 configured to be coupled to the fan rotor 38 or rotor disk 39 and to the frame 102. For example, the support ring 124 may be removably coupled to the fan rotor 38 or rotor disk 39 using a suitable fastener, such as one or more nuts, bolts, screws, etc.

As shown, the system 100 may include a motor configured to rotate the rotating shaft 114 and thus the cutting disks 116 of the cutting apparatus 112. For example, in the illustrated embodiment, an air motor 126 may be drivingly coupled to the rotating shaft 114 in order to rotate the cutting disks 116 of the cutting apparatus 112. However, it should be appreciated that the motor may generally have any other suitable configuration such as an electric motor or an internal combustion engine. As further illustrated, the air motor 126 may be configured to rotate the rotating shaft 114 about the axial direction A. More specifically, the air motor 126 may rotate the rotating shaft 114 about the axial direction A such that the cutting disks 116 rotate about the axial direction A (e.g., the cutting disks 116 may rotate in the circumferential direction C of the turbofan engine 10).

Referring still to the exemplary embodiment of FIG. 3, the system 100 may include an adjustment mechanism 128 configured to adjust the position of the cutting apparatus 112 along the axial direction A and/or the radial direction R of the turbofan engine 10. For instance, the adjustment mechanism 128 (described in more detail in regard to FIG. 4) may be coupled between the first distal end 110 of the first arm 106 and the cutting apparatus 112. As such, the adjustment mechanism 128 may be utilized to adjust the cutting apparatus 112 in the axial direction A in order to align the cutting apparatus 112 with the abradable coating 80. Further, the adjustment mechanism 128 may be used to extend the cutting apparatus 112 in the radial direction R such that the cutting disks 116 of the cutting apparatus 112 contact the inner annular surface 74 of the abradable coating 80 in order to machine the abradable coating 80. It should be appreciated that, in certain situations, the adjustment mechanism 128 may be used to sequentially extend the cutting apparatus 112 radially outwardly after each circumferential pass about the centerline 12 in order to machine more material from the abradable coating 80.

As further illustrated in FIG. 3, the frame 102 may include a second arm 130 extending from the central location 108, and the system 100 may include a measurement assembly 132 configured to inspect the contour of the inner annular surface 74 of the abradable coating 80. It should be appreciated that the measurement assembly 132 may be utilized to inspect the contour of the inner annular surface 74 in order to ensure the contour of the inner annular surface 74 matches and/or complements the contour of the tip(s) 78 of the fan blade(s) 44 of the turbofan engine 10. More particularly, in the illustrated embodiment, the second arm 130 may include one or more of the frame members 104 extending from the central location 108 to a second distal end 134 of the second arm 130. As illustrated, the measurement assembly 132 may be coupled to the second distal end 134 of the second arm 130 and configured to extend in the radial direction R such that the measurement assembly 132 may inspect the contour of the abradable coating 80.

Figure 4:
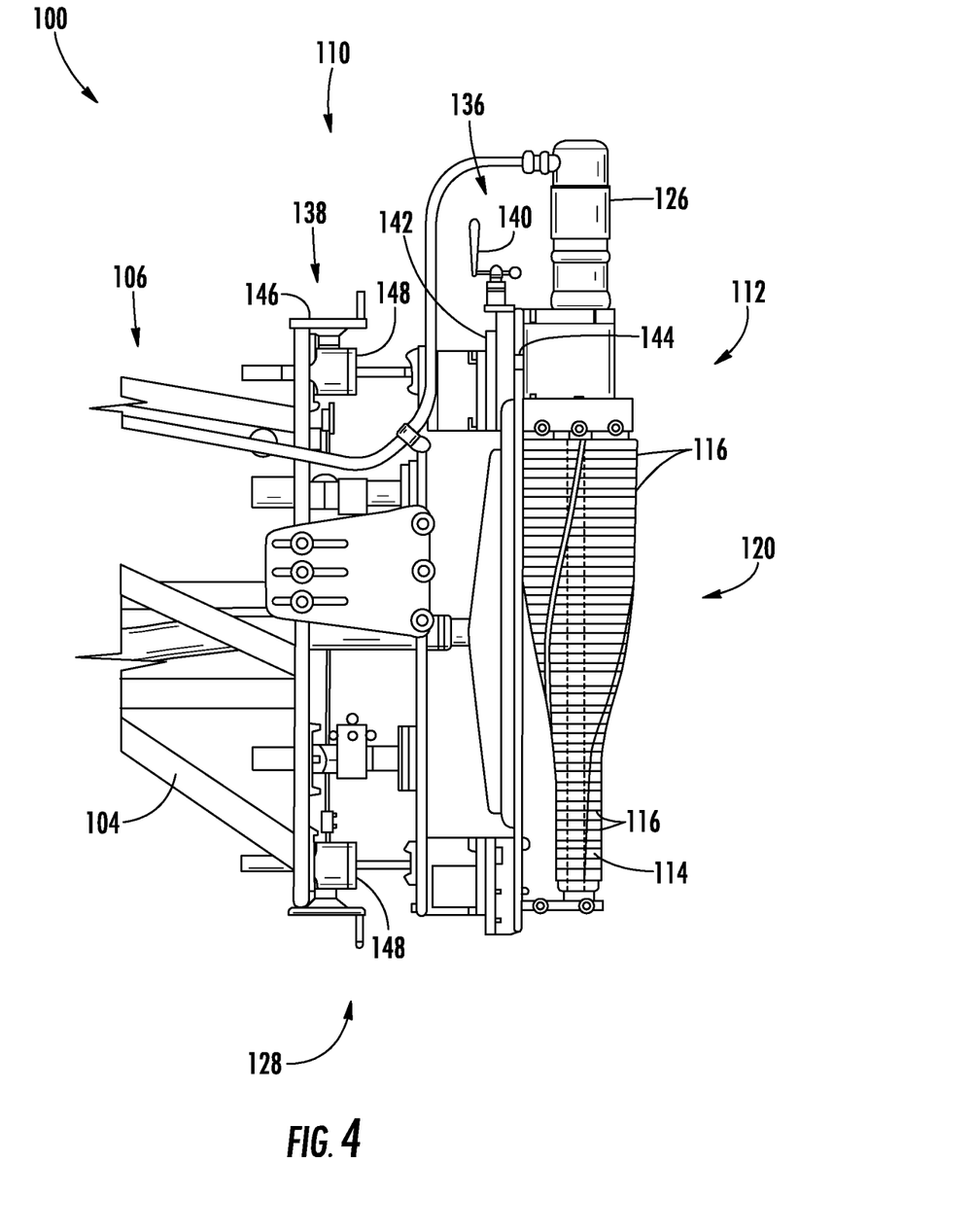
FIG. 4 illustrates a closer view of a first distal end of a first arm of the system of FIG. 3 in accordance with aspects of the present subject matter, particularly illustrating an adjustment mechanism coupled between the first distal end of the first arm and a cutting apparatus.

Referring now to FIG. 4, a closer view of the first distal end 110 of the first arm 106 of the system 100 of FIG. 3 is illustrated in accordance with aspects of the present disclosure. More particularly, FIG. 4 illustrates the adjustment mechanism 128 coupled between the first distal end 110 of the first arm 106 and the cutting apparatus 112. The adjustment mechanism 128 may include an axial adjuster 136 configured to adjust the cutting apparatus 112 in the axial direction A (see, e.g., FIG. 3) of the turbofan engine 10. Additionally, the adjustment mechanism 128 may include a radial adjuster 138 configured to adjust the cutting apparatus 112 in the radial direction R (see, e.g., FIG. 3) of the turbofan engine 10. As such, the radial and axial adjusters 136, 138 may be used in combination to adjust the position of the cutting apparatus 112 to align the cutting disks 116 with the abradable coating 80 (FIG. 3) in the axial direction A and to adjust the cutting apparatus 112 radially outward to machine the inner annular surface 74 of the abradable coating 80.

As shown in FIG. 4, the axial adjuster 136 may include an axial adjustment wheel 140 operable with the cutting apparatus 112 and configured adjust the cutting apparatus 112 at least partially in the axial direction A (see, FIG. 3) forward or aft when the axial adjustment wheel 140 is rotated. For instance, the axial adjustment wheel 140 may be drivingly coupled to a threaded rod 142 of the axial adjuster 136 configured to extend at least partially along the axial direction A of the turbofan engine 10 when the system 100 is inserted within the fan section 16. For example, the cutting apparatus 112 may include a dovetail 144 in engagement with the threads of the threaded rod 142 such that rotating the axial adjustment wheel 140 moves the cutting apparatus 112 at least partially either forward or aft along the axial direction A depending on the direction of rotation of the axial adjustment wheel 140. As such, it should be appreciated that the axial adjustment wheel 140 may be rotated in order to align the cutting apparatus 112 with the abradable coating 80 in the axial direction A. More particularly, the axial adjustment wheel 140 may allow fine axial adjustments in order to align the cutting apparatus 112 such that each of the cutting disks 116 are positioned within forward and aft axial boundaries of the abradable coating 80.

As further shown in regard to the exemplary embodiment of FIG. 4, the radial adjuster 138 may include a radial adjustment wheel 146 operable with the cutting apparatus 112 and configured to extend and/or retract the cutting apparatus 112 at least partially in the radial direction R (see, FIG. 3) when the radial adjustment wheel 146 is rotated. For instance, the radial adjustment wheel 146 may be drivingly coupled to one or more jacks 148 operable with the cutting apparatus 112 in order to extend and/or retract the cutting apparatus 112 at least partially along the radial direction R when the system 100 is inserted within the fan section 16. For instance, rotating the radial adjustment wheel 146 may drive the jack(s) 148 to extend or retract the cutting apparatus 112 at least partially in the radial direction R depending on the direction of rotation of the radial adjustment wheel 146. As such, it should be appreciated that the radial adjustment wheel 146 may be rotated in order to extend the cutting apparatus 112 such that at least one of the cutting disks 116 contacts and/or engages the inner annular surface 74 of the abradable coating 80 in order to machine the abradable coating 80.

As further illustrated in FIG. 4, the cutting apparatus 112 may include a number of cutting disks 116 defining the helical cutting profile 120. More particularly, the cutting apparatus 112 may include at least as many cutting disk 116 as required in order to ensure cutting apparatus 112 is able to machine the entire inner annular surface 74 of the abradable coating 80 positioned radially outward from the cutting apparatus 112. As such, it should be appreciated that rotating the cutting apparatus 112 (e.g., by rotating the fan rotor 38 coupled to the attachment structure 122 as shown in FIG. 3) about the centerline 12 in the circumferential direction C may allow the cutting apparatus 112 to machine the entire inner annular surface 74 in order to define the desirable contour of the abradable coating 80. For instance, in certain embodiments, the cutting apparatus 112 may include between 18 and 60 cutting disks 116. More particularly, the cutting apparatus 112 may include between 30 and 46 cutting disks 116. In one particular embodiment, the cutting apparatus 112 may include 46 cutting disks 116. Generally, the number of cutting disks 116 required to extend along the full length of the abradable coating 80 in the axial direction A may be determined by the axial length of the abradable coating 80 and the axial cutting profile of each of the cutting disks 116.

Additionally, the cutting apparatus 112 may include two or more cutting disks 116 defining different diameters in order to machine a contour within the abradable coating 80 that is not radially constant. For instance, as shown in FIG. 3, the inner annular surface 74 of the abradable coating 80 may generally taper between a forward end 149 and an aft end 150 of the abradable coating 80. As such, one or more of the cutting disks 116 configured to be positioned toward the forward end 149 of the abradable coating 80 may define a larger diameter than one or more of the cutting disks 116 configured to be positioned toward the aft end 150 of the abradable coating 80. However, in other embodiments, the inner annular surface 74 may define a constant radial contour. As such, each of the cutting disks 116 may define the same or approximately the same diameter. Still further, the inner annular surface 74 may generally expand in the radial direction at one or more locations along the axial direction A. As such, one or more of the cutting disks 116 configured to be positioned toward the forward end 149 of the abradable coating 80 may define a smaller diameter than one or more of the cutting disks 116 configured to be positioned toward the aft end 150 of the abradable coating 80.

Figure 5:
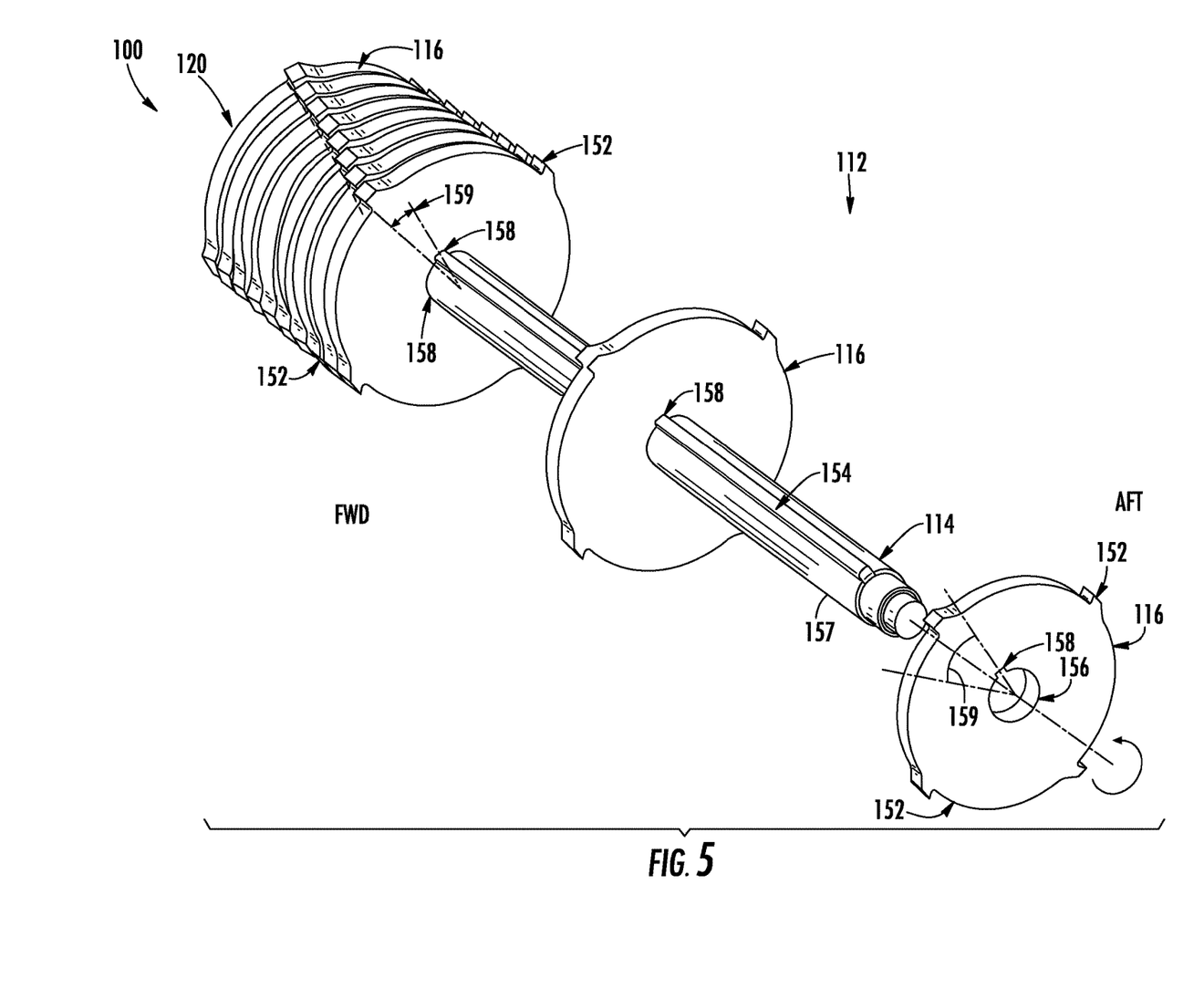
FIG. 5 illustrates an exploded view of a portion of the cutting apparatus of FIGS. 3 and 4 in accordance with aspects of the present subject matter, particularly illustrating a rotating shaft and cutting disks of the cutting apparatus.

Referring now to FIG. 5, an exploded view of a portion of the cutting apparatus 112 of FIGS. 3 and 4 is illustrated in accordance with aspects of the present disclosure. More particularly, FIG. 5 illustrates the rotating shaft 114 and several of the cutting disks 116 configured to define the helical cutting profile 120. In certain embodiments, the rotating shaft 114 may be a solid shaft. Further, though several cutting disks 116 are illustrated in the embodiment of FIG. 5 for clarity, it should be appreciated that the cutting apparatus 112 may include more or less cutting disks 116— such as 46 or more cutting disks 116. Generally, the cutting apparatus 112 defining the helical cutting profile 120 may reduce the number of teeth 152 of the cutting disks 116 that contact and/or engage the inner annular surface 74 of the abradable coating 80. For example, teeth 152 of the cutting disk 116 that form a helix or spiral down the length of the rotating shaft 114 may stagger the teeth 152 of adjacent cutting disks 116 such that only one tooth 152 of adjacent cutting disks 116 is positioned to machine the abradable coating 80 at a time while the rotating shaft 114 is rotated. Generally, reducing the number of teeth 152 actively machining the abradable coating 80 at any one instant may reduce the power output required from the motor drivingly coupled to the rotating shaft 114 (e.g., the air motor 126 of FIGS. 3 and 4). As such, a smaller motor and/or a motor with a lower maximum torque rating may be used to drive the rotating shaft 114, potentially leading to increased efficiency of the system 100.

As illustrated in FIG. 5, the rotating shaft 114 may include a notch 157 (e.g., a standard size key wedge) operable with a key 154 (such as groove or tongue) extending along the length of the rotating shaft 114. However, in other embodiments, the key 154 may be formed integrally with the rotating shaft 114. As shown, the key 154 may extend along the length of the rotating shaft 114. As shown, each cutting disk 116 may define a bore hole 156 such that each cutting disk 116 may be received by the rotating shaft 114 and slid down the length of the rotating shaft 114. Further, each of the cutting disks 116 may define a notch 158 operable with the key 154 in order to define the helical cutting profile 120. For example, each cutting disk 116 may be slid along the length of the rotating shaft 114 such that the notch 158 engages the key 154 and aligns each of the cutting disks 116 into the helical cutting profile 120. More particular, as shown, each cutting disk 116 may define an angle 159 between the notch 158 and a tooth 152. Further, the angle 159 of each subsequent cutting disk 116 in the aft direction may be larger in order offset the teeth 152 of adjacent cutting disks 116 into the helical cutting profile 120 due to the clocked arrangement of the notches 158. Moreover, the teeth 152 of each of the cutting disks 116 may be secured into the helical cutting profile 120 due to the clocked arrangement of the each notch 158 with respect to each cutting disk 116. For example, one or more of the cutting disks 116 may be coupled to the rotating shaft 114 in order to secure the cutting disk(s) 116 to the rotating shaft 114. In several embodiments, at least one of the cutting disks 116 may be coupled to the rotating shaft 114 using a fastener such as a pin, screw, bolt, etc. (not shown).

It should be appreciated that, in the illustrated embodiment, one configuration of the rotating shaft 114 and cutting disks 116 is shown in order to define the helical cutting profile 120. However, in other embodiments, alternative and/or additional configurations may be utilized in order to define the helical cutting profile 120. For instance, each of the cutting disks 116 may individually be secured to the rotating shaft 114 (e.g., by use of fasteners) without a key 154 such that the teeth 152 of the cutting disks 116 define the helical cutting profile 120. Further, other configurations and arrangements of the rotating shaft 114 and cutting disks 116 may occur to one of ordinary skill in the art to define the helical cutting profile 120. In the illustrated embodiment, each cutting disk 116 includes four teeth 152. In other embodiments, each cutting disk 116 may include more or less than four teeth 152. It should also be appreciated that the number of teeth 152 may be determined by the desirable number of teeth 152 engaging the abradable coating 80. For instance, including more than four teeth 152 may increase the number of teeth 152 that contact and/or engage the abradable coating 80 at any one time. As such, cutting disks 116 with more teeth 152 may reduce the time required to machine the abradable coating 80 but may also require a motor with a higher torque output to drive the rotating shaft 114. Contrarily, reducing the number of teeth 152 on each cutting disk 116 may require a lower torque output from the motor driving the rotating shaft 114 but may also increase the time required to machine the abradable coating 80.

Figure 6:
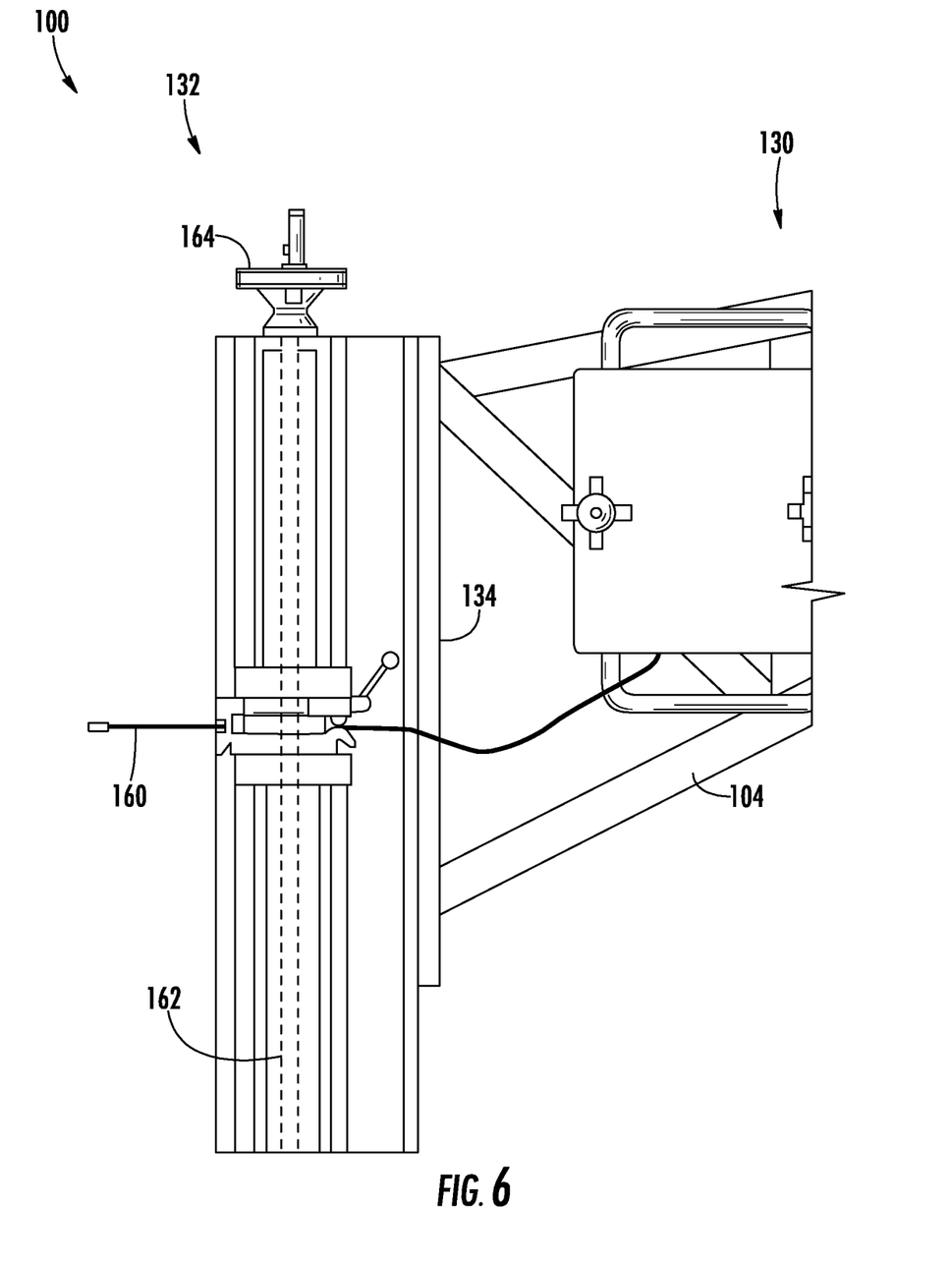
FIG. 6 illustrates a closer view of a second distal end of a second arm of the system of FIG. 3 in accordance with aspects of the present subject matter, particularly illustrating a measurement assembly coupled to the second distal end and a measurement probe extending radially outward.

Referring now to FIG. 6, a closer view of the second distal end 134 of the second arm 130 is illustrated in accordance with aspects of the present disclosure. More particularly, FIG. 6 illustrates the measurement assembly 132 coupled to the second distal end 134 such that a measurement probe 160 is configured to extend radially outward to inspect the contour of the inner annular surface 74 of the abradable coating 80 when the system 100 is inserted within the turbofan engine 10 (see, e.g., FIG. 3). As such, it should be appreciated that the measurement assembly 132 may be used to inspect the inner annular surface 74 to ensure the cutting apparatus 112 machines a desirable contour within the abradable coating 80. Further, data communicated from the measurement assembly 132 indicative of the contour of the inner annular surface 74 may indicate further machining of the abradable coating 80 is required to achieve the desired contour of the inner annular surface 74.

As shown in FIG. 6, the measurement assembly 132 may include a threaded rod 162 configured to extend at least partially along the axial direction A (see, e.g., FIG. 3) of the turbofan engine 10 when the system 100 is inserted within the fan section 16. The measurement probe 160 may be operable with the threaded rod 162 and configured to extend generally in the radial direction R (FIG. 3) when the system 100 is inserted within the turbofan engine 10 in order to inspect the contour of the abradable coating 80. Additionally, the measurement assembly 132 may include an adjustment wheel 164 configured to rotate the threaded rod 162 such that the measurement probe 160 is adjusted at least partially in the axial direction A. For instance, the measurement probe 160 may include a dovetail (not shown) in engagement with threads of the threaded rod 162 such that rotation of the threaded rod 162 moves the measurement probe 160 at least partially either forward or aft along the axial direction A depending on the direction of rotation of the threaded rod 162. Further, the adjustment wheel 164 may be drivingly coupled to the threaded rod 162 such that rotating the adjustment wheel 164 in one direction moves the measurement probe 160 forward in the axial direction A, while rotating the adjustment wheel 164 in the opposite direction moves the measurement probe 160 aft in the axial direction A. As such, the position of the measurement probe 160 may be adjusted along the axial direction A in order to inspect the contour of the abradable coating 80 positioned radially outward from the measurement assembly 132. Further, the system 100 may be rotating circumferentially about the centerline 12 (see, e.g., FIG. 3) in order to inspect the contour of the abradable coating 80 at different circumferential locations within the fan section 16.

Figure 7:
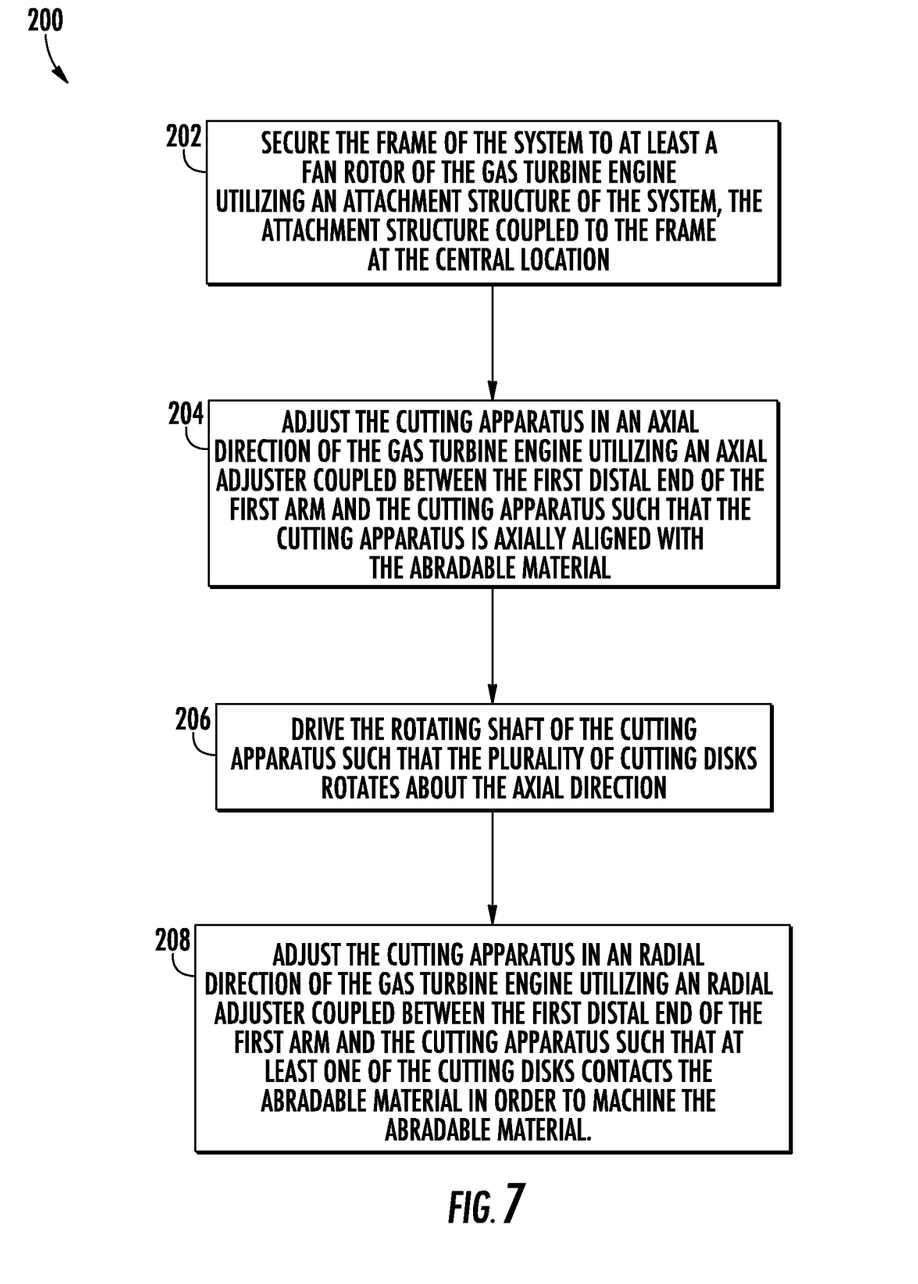
FIG. 7 illustrates a flow diagram of one embodiment of a method of machining an abradable material of a turbofan engine in accordance with aspects of the present subject matter.

Referring now to FIG. 7, a flow diagram of one embodiment of a method 200 of machining an abradable material of a gas turbine engine utilizing a system including a frame, a first arm extending from a central location of the frame, and a cutting apparatus is illustrated in accordance with aspects of the present disclosure. In general, the method 200 will be described herein with reference to the turbofan engine 10 and system 100 described above in reference to FIGS. 1-6. For instance, the cutting apparatus 112 may be coupled to a first distal end 110 of the first arm 106 and include a rotating shaft 114 and a plurality of cutting disks 116 coupled to the rotating shaft 114 such that the cutting disks 116 define the helical cutting profile 120. In one embodiment, the abradable material may include the abradable coating 80 as described in regard to FIGS. 2 and 3. Further, the abradable coating 80 may include a repaired portion 118, a new abradable coating 80, or an existing abradable coating 80 requiring machining of the innermost layer of the inner annular surface 74 in order to perform a repair procedure.

However, it should be appreciated by those of ordinary skill in the art that the disclosed method 200 may generally be utilized to machine any abradable material in connection with any gas turbine engine having any suitable configuration and/or any system having any suitable system configuration. In addition, although FIG. 7 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As depicted in FIG. 7, the method 200 may include (202) securing the frame 102 of the system 100 to at least a fan rotor 38 of the turbofan engine 10 utilizing the attachment structure 122 of the system 100 coupled to the frame 102 at the central location 108. The method 200 may further include (204) adjusting the cutting apparatus 112 in the axial direction A of the turbofan engine 10 utilizing the axial adjuster 136 coupled between the first distal end 110 of the first arm 106 and the cutting apparatus 112 such that the cutting apparatus 112 is axially aligned with the abradable material, e.g., the abradable coating 80. In another embodiment, adjusting the cutting apparatus 112 in the axial direction A may include rotating the axial adjustment wheel 140 drivingly coupled to the threaded rod 142 of the axial adjuster 136 extending at least partially along the axial direction A. Moreover, the threaded rod 142 may be operable with the cutting apparatus 112 such that the cutting apparatus 112 is adjusted at least partially in the axial direction A.

In certain embodiments, the method 200 may include (206) driving the rotating shaft 114 of the cutting apparatus 112 such that the plurality of cutting disks 116 rotates about the axial direction A. Additionally, as show in FIG. 7, the method 200 may include (208) adjusting the cutting apparatus 112 in the radial direction R of the turbofan engine 10 utilizing the radial adjuster 138 coupled between the first distal end 110 of the first arm 106 and the cutting apparatus 112 such that at least one of the cutting disks 116 contacts the abradable material in order to machine the abradable material, such as the abradable coating 80. In a further embodiment, adjusting the cutting apparatus 112 in the radial direction R may include rotating the radial adjustment wheel 146 operable with one or more jacks 148 of the radial adjuster 138. As such, the jack(s) 148 may be configured to extend and retract the cutting apparatus 112 at least partially in the radial direction R of the turbofan engine 10.

In an additional embodiment, the method 200 may further include rotating the system 100 around the circumferential direction C of the turbofan engine 10 such that the cutting apparatus 112 machines at least a portion of the abradable material along the circumferential direction C. In another embodiment, the system 100 may further include a second arm 130 extending from the central location 108 of the frame 102 and an axially aligned measurement assembly 132 including a measurement probe 160 coupled to a second distal end 134 of the second arm 130. For example, the measurement assembly 132 may include the threaded rod 162 extending at least partially along the axial direction A of the turbofan engine 10 and the measurement probe 160 extending from the measurement assembly 132 (e.g., at least partially in the radial direction R of the turbofan engine 10). In such an embodiment, the method 200 may include inspecting a contour of the abradable material by adjusting the position of the measurement probe 160 along the axial direction A of the turbofan engine 10. In a further embodiment, adjusting the position of the measurement probe 160 may include rotating the adjustment wheel 164 coupled to the threaded rod 162 operable with the measurement probe 160 in order to adjust the measurement probe 160 axially forward or aft.

This written description uses exemplary embodiments to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method of machining an abradable material of a gas turbine engine utilizing a system including a frame, a first arm extending from a central location of the frame, and a cutting apparatus coupled to a first distal end of the first arm and including a rotating shaft and a plurality of cutting disks coupled to the rotating shaft such that the plurality of cutting disks define a substantially frusta-conical shape and a helical cutting profile, the first arm further comprising a central location end, the first distal end being at the opposite end of the first arm as the central location end, the gas turbine engine extending along a first longitudinal centerline axis, the rotating shaft extending along a second longitudinal centerline axis disposed substantially parallel to the first longitudinal centerline axis, wherein a motor is coupled to the plurality of cutting disks to form a combination and the combination of the motor and the cutting disks is disposed so as to extend along the second longitudinal centerline axis direction, the method comprising:
    securing the frame of the system to at least a fan rotor of the gas turbine engine utilizing an attachment structure of the system, the attachment structure coupled to the frame at the central location end of the first arm;
    adjusting the cutting apparatus in an axial direction of the gas turbine engine utilizing an axial adjuster coupled between the first distal end of the first arm and the cutting apparatus such that the cutting apparatus is axially aligned with the abradable material;
    driving the rotating shaft of the cutting apparatus such that the plurality of cutting disks rotates about the axial direction; and
    adjusting the cutting apparatus in a radial direction of the gas turbine engine utilizing a radial adjuster coupled between the first distal end of the first arm and the cutting apparatus such that only an outer circumferential periphery of multiple ones of the plurality of cutting disks contact the abradable material simultaneously.

2. The method of claim 1, further comprising:
    rotating the system around a circumferential direction of the gas turbine engine such that the cutting apparatus machines at least a portion of the abradable material along the circumferential direction.

3. The method of claim 1, wherein the system further includes a second arm extending from the central location of the frame and an axially aligned measurement assembly including a measurement probe coupled to a second distal end of the second arm, the method further comprising:
    inspecting a contour of the abradable material by adjusting a position of the measurement probe along the axial direction.

4. The method of claim 3, wherein adjusting the position of the measurement probe comprises rotating an adjustment wheel coupled to a threaded rod operable with the measurement probe in order to adjust the measurement probe axially forward or aft.

5. The method of claim 1, wherein adjusting the cutting apparatus in the axial direction comprises rotating an axial adjustment wheel drivingly coupled to a threaded rod of the axial adjuster extending at least partially along the axial direction, the threaded rod operable with the cutting apparatus such that the cutting apparatus is adjusted at least partially in the axial direction.

6. The method of claim 1, wherein adjusting the cutting apparatus in the radial direction comprises rotating a radial adjustment wheel operable with one or more jacks of the radial adjuster, the one or more jacks configured to extend and retract the cutting apparatus at least partially in the radial direction of the gas turbine engine.

7. The method of claim 1, wherein the abradable material comprises a repaired portion.

8. A system for machining an abradable material of a gas turbine engine, the system comprising:
    a frame including a first arm extending from a central location;
    wherein the first arm comprises a first distal end and a central location end, the first distal end being at the opposite end of the first arm as the central location end, the gas turbine engine extending along a first longitudinal centerline axis;
    an attachment structure coupled to the frame at the central location end of the first arm, the attachment structure configured to couple to at least a fan rotor of the gas turbine engine;
    a cutting apparatus;
    an adjustment mechanism coupled between the first distal end of the first arm and the cutting apparatus, wherein the adjustment mechanism is configured to adjust a position of the cutting apparatus along an axial direction and a radial direction of the gas turbine engine, the adjustment mechanism not encompassing the first arm; and
    a motor;
    wherein the cutting apparatus includes a rotating shaft extending along a second longitudinal centerline axis disposed substantially parallel to the first longitudinal centerline axis, and driven by the motor and plurality of cutting disks coupled to the rotating shaft, wherein the plurality of cutting disks define a substantially frusta-conical shape and helical cutting profile and wherein the motor is coupled to the plurality of cutting disks to form a combination and the combination of the motor and the cutting disks is disposed so as to extend along the second longitudinal centerline axis direction such that only an outer circumferential periphery of multiple ones of the plurality of cutting disks contact the abradable material simultaneously,
    wherein the helical cutting profile is configured to machine a contour within the abradable material complementary to at least one fan blade of the gas turbine engine.

9. The system of claim 8, wherein the plurality of cutting disks are configured to extend along a total length of the abradable material in the axial direction of the gas turbine engine.

10. The system of claim 8, wherein the frame further includes a second arm extending from the central location, the system further comprising:
    a measurement assembly coupled to a second distal end of the second arm opposite the central location, wherein the measurement assembly is configured to inspect the contour of the abradable material.

11. The system of claim 10, wherein the measurement assembly comprises a threaded rod configured to extend at least partially along the axial direction of the gas turbine engine, a measurement probe extending from and operable with the threaded rod, and an adjustment wheel configured to rotate the threaded rod such that the measurement probe is adjusted at least partially in the axial direction of the gas turbine engine.

12. The system of claim 8, wherein the adjustment mechanism comprises an axial adjuster including a threaded rod operable with the cutting apparatus and configured to extend at least partially along the axial direction of the gas turbine engine and an axial adjustment wheel configured to rotate the threaded rod such that the cutting apparatus is adjusted at least partially in the axial direction.

13. The system of claim 8, wherein the adjustment mechanism comprises a radial adjuster including at least one jack operable with the cutting apparatus and a radial adjustment wheel configured to extend and retract the cutting apparatus at least partially in the radial direction of the gas turbine engine.

14. The system of claim 8, wherein the rotating shaft includes a key extending along a length of the rotating shaft, and wherein each cutting disk of the plurality of cutting disks includes a notch operable with the key such that the plurality of cutting disks define the helical cutting profile.

15. The system of claim 8, wherein the plurality of cutting disks comprises two or more cutting disks defining different diameters.

16. The system of claim 8, wherein the plurality of cutting disks comprises between 18 and 46 cutting disks.

17. The system of claim 8, wherein the plurality of cutting disks include one or more teeth.

18. The system of claim 8, wherein the attachment structure comprises a support ring configured to be coupled to at least the fan rotor of the gas turbine engine.

19. The system of claim 8, wherein the motor is an air motor.

* * * * *

UNITED STATES PATENT AND TRADEMARK OFFICE
CERTIFICATE OF CORRECTION

PATENT NO. : 11,338,461 B2
APPLICATION NO. : 16/395914
DATED : May 24, 2022
INVENTOR(S) : Benjamin Tonatiuh Hernandez et al.

It is certified that error appears in the above-identified patent and that said Letters Patent is hereby corrected as shown below:

On the Title Page

Column 2, item (56) Other Publications, Line 2, delete "10-11" and insert -- 10-1 --, therefor Signed and Sealed this
Twenty-third Day of August, 2022

Katherine Kelly Vidal
*Director of the United States Patent and Trademark Office*